United States Patent
Menzel et al.

(10) Patent No.: US 11,885,416 B2
(45) Date of Patent: Jan. 30, 2024

(54) DYNAMIC SHAFT SEAL

(71) Applicant: CARL FREUDENBERG KG, Weinheim (DE)

(72) Inventors: Jasmin Menzel, Weinheim (DE); Boris Traber, Hirschberg (DE); Matthias Adler, Heppenheim (DE); Eva Fleischmann, Alsbach-Haehnlein (DE); Christine Portela Cubillo, Bickenbach (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 17/630,519

(22) PCT Filed: Jul. 23, 2020

(86) PCT No.: PCT/EP2020/070828
§ 371 (c)(1),
(2) Date: Jan. 27, 2022

(87) PCT Pub. No.: WO2021/018733
PCT Pub. Date: Feb. 4, 2021

(65) Prior Publication Data
US 2023/0076622 A1    Mar. 9, 2023

(30) Foreign Application Priority Data

Jul. 29, 2019   (DE) .................... 10 2019 120 368.6

(51) Int. Cl.
*F16J 15/3284*   (2016.01)
*C08K 3/04*   (2006.01)

(52) U.S. Cl.
CPC .......... *F16J 15/3284* (2013.01); *C08K 3/042* (2017.05)

(58) Field of Classification Search
CPC .............................. F16J 15/3284; C08K 3/042
See application file for complete search history.

(56) References Cited

U.S. PATENT DOCUMENTS

| 2013/0102719 A1 | 4/2013 | John |
| 2015/0233373 A1 | 8/2015 | Sicilian |
| 2015/0252902 A1 | 9/2015 | Critchley |

(Continued)

FOREIGN PATENT DOCUMENTS

| CN | 105968446 A | 9/2016 |
| CN | 106380755 A | 2/2017 |

(Continued)

OTHER PUBLICATIONS

Eckert, Victoria, Growth mechanisms and surface properties undoped and N-doped carbon nanotubes (dissertation), Mar. 6, 2019, p. 3-4, Technische Universität Dresden, Dresden, Germany.

(Continued)

*Primary Examiner* — Gilbert Y Lee
(74) *Attorney, Agent, or Firm* — LEYDIG, VOIT & MAYER, LTD.

(57) ABSTRACT

The invention relates to a dynamic shaft seal which comprises (a) elastomer material and (b) graphene without a chemically modified surface in an amount of from 0.1 to 2 phr, in relation to 100 parts by weight of the elastomer material, as the sole constituent of the dynamic shaft seal made of elemental carbon.

14 Claims, 4 Drawing Sheets

(56) References Cited

U.S. PATENT DOCUMENTS

| | | |
|---|---|---|
| 2017/0292051 A1 | 10/2017 | Traber |
| 2018/0086901 A1 | 3/2018 | Dolog |
| 2018/0347361 A1* | 12/2018 | Sicilian .................. F01C 1/101 |
| 2019/0040211 A1* | 2/2019 | Chen ...................... C08K 3/042 |

FOREIGN PATENT DOCUMENTS

| | | |
|---|---|---|
| CN | 107090107 A | 8/2017 |
| CN | 107345038 A | 11/2017 |
| DE | 102014014392 A1 | 4/2016 |
| EP | 3124534 A1 | 2/2017 |
| JP | 2013023575 A | 2/2013 |
| JP | 5816474 B2 * | 11/2015 |
| WO | WO 2018222530 A1 | 12/2018 |

OTHER PUBLICATIONS

Moller, Bjoern, Production, characterization and further processing of Carbon nanotube dispersions (dissertation), Mar. 1, 2013, p. 25, Universität Stuttgart, Stuttgart, Germany.

* cited by examiner

DYNAMIC SHAFT SEAL

CROSS REFERENCE TO RELATED APPLICATIONS

This application is a U.S. National Phase application under 35 U.S.C. § 371 of International Application No. PCT/EP2020/070828, filed on Jul. 23, 2020, and claims benefit to German Patent Application No. DE 10 2019 120 368.6, filed on Jul. 29, 2019. The International Application was published in German on Feb. 4, 2021 as WO 2021/018733 A1 under PCT Article 21(2).

FIELD

The invention relates to dynamic shaft seals comprising elastomeric material and graphene. The invention also relates to tribological systems comprising shafts and dynamic shaft seals, uses of dynamic shaft seals, and methods of reducing abrasion.

BACKGROUND

The present invention relates generally to the field of seal technology. In seal technology, a distinction is made between seal bodies for static applications and seal bodies for dynamic applications. Seal bodies for dynamic applications regularly seal tribological systems in which the seal body and a mating surface move relative to each other. As a result of the relative movement, abrasion is generated on the seal body. This becomes visible as wear. As a result of the wear, the seal body can become leaky or fail. During operation, abrasion is also regularly generated on the mating surface of the seal body. This abrasion can also lead to leaks in the tribological system.

Fillers in a seal body can be suitable for reducing its wear. Mineral fillers are generally used as fillers in seal bodies. Mineral fillers are hard fillers. In some cases, a large quantity of mineral fillers is used in order to achieve a sufficient reduction in the wear of seal bodies. This simultaneously leads to an increase in the hardness of the seal body. The increased hardness results in increased abrasion on the mating surface of the seal body. A seal body made hard by mineral fillers typically reduces the service life of a dynamically loaded tribological system made of seal body and mating surface.

Dynamic shaft seals, e.g., radial shaft seals, are seal bodies for dynamic applications used in tribological systems subject to rotational loads. In such tribological systems, the dynamic shaft seal forms a seal body whose mating surface is regularly a shaft. In such systems, wear of the seal body is indicated by abrasion on the dynamic shaft seal. Wear of the mating surface of the seal body is indicated by abrasion on the shaft. Such wear on the shaft is referred to as shaft run-in. Shaft run-in regularly leads to leakage of the tribological system made of dynamic shaft seal and shaft.

For tribological systems with dynamic shaft seal and shaft, it is observed that hard dynamic shaft seals lead to relatively high abrasion on the shaft. On the other hand, soft dynamic shaft seals protect the shaft from abrasion, but are themselves subject to relatively high abrasion. Between these opposing tendencies of abrasion on the dynamic shaft seal on the one hand and abrasion on the shaft on the other hand, a suitable balance must desirably be found. Finding such a balance is often difficult. Dynamic shaft seals known in the state of the art are still in need of improvement in this respect.

Dynamic shaft seals used in the automotive sector are subject to ever higher loads due to constantly increasing speeds, pressures and temperatures. In the automotive sector, dynamic driving behavior in particular leads to increased wear of dynamic shaft seals and their mating surfaces.

In the prior art, it is also proposed to use carbon-based fillers. CN 105968446 A describes synthetic materials for the manufacture of seals which contain, among other things, carbon black. CN 107345038 A describes a sealing element containing, among other things, vermicular graphite and graphene. CN 107090107 A describes the use of graphene in an abrasion-resistant rubber or vulcanized rubber, respectively. EP 3 124 534 A1 describes seal bodies comprising carbon fibers. US 2018/0086901 A1 describes elastomer nanocomposites comprising a functionalized filler. The functionalized filler may be, among other things, functionalized graphene and is compulsorily crosslinked with an elastomer for load displacement.

Carbon nanotubes (CNTs) are also used as fillers in seal bodies. DE 10 2014 014 392 A1 describes seal bodies in which CNTs are mixed into an elastomer mixture. CN 106380755 A describes fluorine-containing elastomers for seals, which may contain graphene and CNTs. The use of CNTs has disadvantages. The CNTs have to be distributed in the elastomer mixture by complex processes. The reinforcement by the CNTs regularly leads to an increased viscosity of the raw mixture, which can make it difficult to process. Long-term consequences of the use of CNTs have not yet been clarified. Due to the fiber structure of CNTs, there are health, safety and environmental concerns (HSE concerns; HSE=Health Safety Environment). Due to a high light absorption capacity, CNT-containing elastomer mixtures cannot be dyed. Due to the deep black, glossy surfaces of components made of CNT-containing elastomer mixtures, automatic visual inspection in production is difficult. Due to the high aspect ratio of the CNTs, the characteristics of a CNT-containing elastomer mixture are anisotropic.

A major disadvantage of such carbon-based fillers is that the sealants generally exhibit very high abrasion due to the low hardness of the carbon.

SUMMARY

In an embodiment, the present invention provides a dynamic shaft seal. The dynamic shaft seal includes an elastomeric material and graphene. The graphene without a chemically modified surface is in an amount of 0.1 to 2 phr, based on 100 parts by weight of the elastomeric material, as the sole elemental carbon component of the dynamic shaft seal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
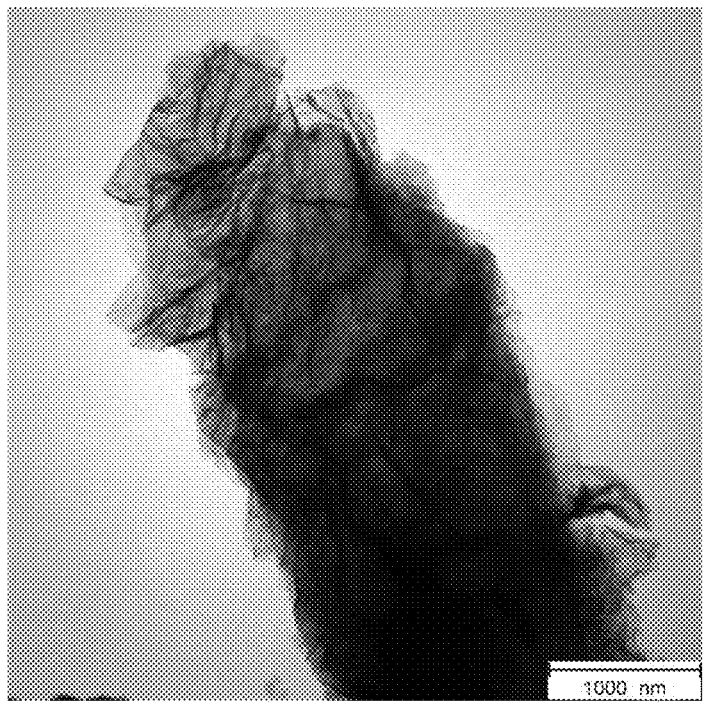
FIG. 1 is a transmission electron microscopy image (TEM image) of a mixture according to the invention containing only graphene, i.e., only graphene without a chemically modified surface.

Embodiments of the present invention provide dynamic shaft seals which at least partially and preferably completely overcome the disadvantages described above.

Embodiments of the present invention provide, in a tribological system, a balance between the abrasion on a dynamic shaft seal on the one hand and the abrasion on its mating surface on the other hand.

In particular, embodiments of the present invention simultaneously achieve both an improvement in the wear resistance of a dynamic shaft seal and a reduction in the abrasion of its mating surface.

Embodiments of the present invention also achieve an overall improvement in the mechanical value profile of a dynamic shaft seal. In particular, a dynamic shaft seal shall be provided for the automotive sector which meets the challenges arising from dynamic driving behavior.

Embodiments of the present invention also circumvent the difficulties of known dynamic shaft seals. In particular, lack of colorability and more difficult automatic visual inspection, HSE problems, anisotropy of mechanical properties and/or difficult processability of dynamic shaft seals shall be circumvented.

Exemplary embodiments of the present invention provide a dynamic shaft seal comprising:

(a) elastomeric material, and (b) graphene without chemically modified surface in an amount of 0.1 to 2 phr, based on 100 parts by weight of the elastomeric material, as the sole elemental carbon component of the dynamic shaft seal.

Dynamic Shaft Seal

A dynamic shaft seal per se is known to those skilled in the art addressed herein. A preferred example of a dynamic shaft seal according to exemplary embodiments of the present invention is a radial shaft seal. Radial shaft seals (or rotary shaft seals; RSS) are lip seals, wherein in operation a seal lip is in radial contact with a rotating part. The sealing effect of the radial shaft seal is based on an elasto-hydro-dynamic recirculation effect. This recirculation effect is regularly based on two different seal edge angles and a characteristic wear of the mating surface. The medium to be sealed should be on the side with the larger seal edge angle. If medium is offered on the side with the smaller seal edge angle, it is pumped to the side with the larger seal edge angle. Radial shaft seals are thus typically active dynamic shaft seals and can seal without leakage.

According to embodiments of the present invention, the service life of the dynamic shaft seal according to the invention can be extended. In operation, the dynamic shaft seal according to embodiments of the present invention leads to a compensation between an abrasion on the dynamic shaft seal itself and the abrasion on its mating surface. The dynamic shaft seal according to embodiments of the present invention has an improved wear resistance and at the same time leads to a lower abrasion at its mating surface. As a result, the overall wear of the tribological system comprising the dynamic shaft seal and the mating surface is reduced and the service life of the system is increased. A system made of the dynamic shaft seal according to the invention and its mating surface regularly remains tight for longer.

Component (a)

The dynamic shaft seal according to exemplary embodiments of the present invention comprises elastomeric material as component (a). An elastomeric material can deform elastically when subjected to tensile and/or compressive load. After loading, the elastomeric material returns to its original, undeformed shape. According to exemplary embodiments of the present invention, the elastomeric material is preferably formed by one or more dimensionally stable elastically deformable plastics, more preferably by one dimensionally stable elastically deformable plastic. According to exemplary embodiments of the present invention, the elastomeric material is not linked or crosslinked to the component (b), in particular not linked or crosslinked via functional groups. In particular, the elastomeric material is not linked or crosslinked to the component (b) via one or more metal ions (e.g., zinc ions, $Zn^{2+}$).

Component (b)

The dynamic shaft seal according to exemplary embodiments of the present invention comprises as ingredient (b) graphene without [a] chemically modified surface in an amount of 0.1 to 2 phr, based on 100 parts by weight of the elastomeric material, as the sole elemental carbon component (the sole component made of elemental carbon, i.e., carbon in elemental form).

Graphene is generally the name for a modification of carbon with a two-dimensional structure. In this modification, each carbon atom is surrounded by three other carbon atoms at an angle of 120°, forming a honeycomb pattern or graphene plane. The carbon atoms of graphene are $sp^2$-hybridized. Each carbon atom can form three equivalent σ-bonds to other carbon atoms. The carbon-carbon bond lengths are all equal and are ideally 142 pm ($1.42 \cdot 10^{-10}$ m). The third, unhybridized 2p-orbitals are perpendicular to the graphene plane and form a delocalized π-bond system. Ideal graphene is thus formed by a single-layer carbon sheet (monolayer graphene). Monolayer graphene has an ideal layer thickness of 0.335 nm ($3.35 \cdot 10^{-10}$ m). According to exemplary embodiments of the present invention, the graphene used preferably comprises at least partially monolayer graphene. According to the invention, the graphene used may optionally be made exclusively of monolayer graphene.

In industrial applications, multilayer graphene with less than 10 carbon layers is also referred to as graphene. According to exemplary embodiments of the present invention, the graphene used preferably has fewer than 10 carbon layers.

According to exemplary embodiments of the present invention, graphene is used as elemental carbon. Thus, the graphene as such is used, i.e., graphene without chemically modified surface. Accordingly, the graphene is not functionalized. In particular, the graphene is not functionalized via either covalent or non-covalent bonds. In other words, the graphene does not have any functional groups. In particular, the graphene does not have a sulfonate group, a phosphonate group, a carboxylate group, a carboxy group, a sulfonic acid group, a phosphonic acid group, an amino group, a hydroxy group, a thiol group and/or an alkyl group, or a combination of these groups. In particular, no graphene is used whose surface is chemically modified with aminobenzoic acid or polyacrylamide. Without being bound by theory, it is understood that the graphene also advantageously modifies the surface of the dynamic shaft seal because of its unmodified surface. It is understood that the non-modified surface of the graphene results in a particularly favorable wetting behavior of the lubricating medium, which has a beneficial effect on the lubricating condition of the shaft seal. It is understood that the modification of the surface of the dynamic shaft seal by a graphene cross-linked with the elastomeric material is not achievable, or is achievable only to a much lesser extent. It is further understood that even if the wettability of the surface of the dynamic shaft seal, e.g., a seal lip of the dynamic shaft seal, is improved by surface modification of the graphene—for which no evidence was found according to the invention—other properties of the bulk material (comprising components (a) and (b)) may behave or develop adversely. Accordingly, an optimum can be achieved with the non-modified graphene according to the invention, in particular a balance between the different tribological and sealing properties of the dynamic shaft seal.

The dynamic shaft seal according to exemplary embodiments of the present invention is a rotational (rotary) seal. It was surprisingly found that an addition of graphene to dynamic shaft seals leads to an improvement of the wear behavior with rotational relative movement between dynamic shaft seal and mating surface, both in terms of abrasion at the dynamic shaft seal and at the mating surface. In contrast, no positive influences on the wear behavior were observed in tests when graphene was used in dynamic seals with translational relative movement between the seal and the mating surface.

The unit "parts per hundred rubber", abbreviated as "phr", is a common unit in the rubber-chemical industry. It is used to designate the mass fractions of the individual mixture components in a recipe for an elastomeric mixture. These figures are related to 100 (mass) parts of the elastomeric material.

According to exemplary embodiments of the present invention, the graphene is present in the dynamic shaft seal of these embodiments in an amount of 0.1 to 2 phr based on 100 parts by weight of the elastomeric material. The amount of 0.1 to 2 phr of graphene may help to improve the overall mechanical value profile of the dynamic shaft seal. As a result, the dynamic shaft seal according to the invention can be used in particular in the automotive sector. The dynamic shaft seal according to exemplary embodiments of the present invention can ensure a tightness of a tribological system with the dynamic shaft seal for a longer period of time in a dynamic driving behavior.

The graphene forms the only elemental carbon component in the dynamic shaft seal according to exemplary embodiments of the present invention, i.e., the dynamic shaft seal according to these embodiments invention does not contain any other elemental carbon components, in particular no carbon black, no CNTs and no graphite. Apart from the graphene, the dynamic shaft seal according to exemplary embodiments of the present invention also does not contain any other modifications of elemental carbon.

By using graphene as the only elemental carbon component in the dynamic shaft seal according to exemplary embodiments of the present invention, the dynamic shaft seal is more easily dyeable and facilitates automatic visual inspection in production. For the dynamic shaft seal according to exemplary embodiments of the present invention, due to the use of graphene as the only elemental carbon component, no HSE problems and no anisotropy of its mechanical properties are expected. At the same time, better processability is expected.

Graphene Used According to Exemplary Embodiments of the Invention Versus Carbon Blacks Carbon blacks regularly contain $sp^3$-hybridized carbon atoms. Graphene used according to exemplary embodiments of the present invention differs from carbon blacks, among other things, in that the carbon atoms of the graphene are $sp^2$-hybridized.

Carbon blacks are regularly powdery, amorphous solids that typically consist of 80 to 99.5 wt. % carbon. Graphene used according to exemplary embodiments of the present invention differs from carbon blacks, among other things, in that the graphene preferably consists of more than 99.5 wt. % carbon.

Carbon blacks usually consist of spherical primary particles. The primary particles typically have a size of 10 to 300 nm. The primary particles are often coalesced into chain-like, sometimes clump-like aggregates. The aggregates may cluster together and form agglomerates. Graphene used according to exemplary embodiments of the present invention differs from carbon blacks, among other things, in that graphene is not composed of spherical particles, in particular not of particles having a size of 10 to 300 nm.

Graphene Used According to the Invention Versus Graphite

Graphite is crystalline. Graphite crystallizes either in the hexagonal crystal system (hexagonal graphite) or in the rhombohedral crystal system (rhombohedral graphite). Hexagonal graphite crystallizes in space group $P6_3/mmc$ with the lattice parameters $a=2.46 \cdot 10^{-10}$ m and $c=6.71 \cdot 10^{-10}$ m. Rhombohedral graphite crystallizes in space group R-3m with lattice parameters $a=3.64 \cdot 10^{-10}$ m and $\alpha=36.82°$. Graphene used according to exemplary embodiments of the present invention differs from graphite, among other things, in that the graphene is not crystalline. Graphene used according to exemplary embodiments of the present invention differs from graphite, among other things, in that the graphene does not crystallize in space group $P6_3/mmc$, in particular not with the lattice parameters $a=2.46 \cdot 10^{-10}$ m and $c=6.71\ 10^{-10}$ m. Graphene used according to exemplary embodiments of the present invention differs from graphite among other things in that the graphene does not crystallize in space group R-3m, in particular not with the lattice parameters $a=3.64 \cdot 10^{-10}$ m and $\alpha=36.82°$.

Graphite has a specific surface area according to BET (according to DIN ISO 9277:2014-01) of typically 9 to 11 $m^2/g$. Graphene used according to exemplary embodiments of the present invention differs from graphite, among other things, in that the graphene has a specific surface area according to BET (according to DIN ISO 9277:2014-01) of preferably 150 to 1000 $m^2/g$, more preferably 150 to 500 $m^2/g$ and even more preferably 180 to 260 $m^2/g$.

Graphene Used According to the Invention Versus Carbon Nanotubers (CNTs)

Carbon nanotubes consist of a rolled-up, single-layer carbon layer. Carbon nanotubes have a three-dimensional, tubular structure. Graphene has a layered, two-dimensional structure. Graphene used according to exemplary embodiments of the present invention differs from carbon nanotubes, among other things, in that the graphene is not rolled up. Graphene used according to exemplary embodiments of the present invention differs from carbon nanotubes, among other things, in that the graphene does not have a tubular structure.

Further Preferred Embodiments

In accordance with exemplary embodiments of the present invention, it is preferred that the dynamic shaft seal comprises graphene in an amount of 0.1 to 1.5 phr, more preferably in an amount of 0.2 to 1.0 phr, even preferably in an amount of 0.3 to 0.7 phr, particularly preferably in an amount of 0.4 to phr 0.6, and most preferably in an amount of 0.5 phr, based on 100 parts by weight of the elastomeric material. In accordance with exemplary embodiments of the present invention, it was found that the relatively soft filler graphene in a dynamic shaft seal can improve the wear thereof as well as the wear of the mating surface of the dynamic shaft seal in a tribological system. In this regard, it was surprisingly found that even small amounts of graphene of preferably 0.1 to 1.5 phr, more preferably 0.2 to 1.0 phr, even more preferably 0.3 to phr 0.7, particularly preferably 0.4 to phr 0.6 and most preferably 0.5 phr improve the overall wear performance. This was surprising because no effect on wear behavior was expected for small amounts of soft graphene. Without being bound by theory, it is assumed that the graphene, even in small amounts, improves an interaction between the surface of the dynamic shaft seal and regularly used lubricants.

According to exemplary embodiments of the present invention, it is preferred that the graphene has a layer thickness of <3.35 nm, more preferably of <2.68 nm, even more preferably of <2.01 nm, particularly preferably of <1.34 nm and even further preferably of <0.67 nm. In accordance with the exemplary embodiments of the present invention, it was surprisingly found that further improved wear performance of the dynamic shaft seal can be achieved using graphene as a filler with nanoscale dimensions. Without being bound by theory, it is understood that graphene advantageously modifies the surface of the dynamic shaft seal despite its small layer thicknesses.

It is preferred according to exemplary embodiments of the present invention that the dynamic shaft seal is composed of a composition having a compression set of ≤16%, more preferably a compression set of ≤13%, determined according to DIN ISO 815, A. The compression set (CS) is a measure of how an elastomeric material or composition behaves under prolonged, constant compression deformation and subsequent relaxation. It has been shown that a low compression set dynamic shaft seal according to the invention combines improved wear characteristics and sealing properties.

It is preferred according to exemplary embodiments of the present invention that the elastomeric material comprises a material selected from the group ("group em") consisting of: fluororubber (FPM), ethylvinyl acetate (EVA), nitrile butadiene rubber (NBR), hydrogenated nitrile butadiene rubber (HNBR), silicone elastomers, natural rubber (NR), styrene butadiene rubber (SBR), ethylene propylene diene rubber (EPDM), ethylene propylene rubber (EPM), acrylate rubber (ACM), perfluoro rubber (FFPM), vinyl methyl polysiloxane (VMQ), phenyl vinyl methyl polysiloxane (PVMQ), fluoromethyl vinyl polysiloxane (FVMQ), polyisoprene (IR), butyl rubber (IIR), chlorobutyl rubber (CIIR), bromobutyl rubber (BIIR), ethylene acrylate rubber (AEM), butadiene rubber (BR), chloroprene rubber (CR), epichlorohydrin rubber (ECO), chlorosulfonated polyethylene rubber (CSM), polyurethane (PU), thermoplastic elastomers (TPE), acrylonitrile-butadiene-styrene (ABS) and styrene-butadiene-styrene (SBS), and mixtures thereof. By selecting the elastomeric material from this group, a wide variability of elastomeric properties of the dynamic shaft seal is obtained.

It is preferred according to exemplary embodiments of the present invention that the elastomeric material is composed of only one elastomeric material, more preferably only one elastomeric material selected from the above "group em". By using only one elastomeric material, the manufacturing of the dynamic shaft seal becomes easier, as no mixing of different elastomeric materials is required.

It is preferred according to exemplary embodiments of the present invention that the elastomeric material is not chemically modified. The elastomeric material preferably has no functional groups. In particular, the elastomeric material preferably has no hydroxyl group, no amino group, no ether group, no ester group, no amide group, no sulfonate group, no sulfonic acid group, no carboxy group and/or no carboxylate group. Since the elastomeric material does not need to be chemically modified, the elastomeric material is less expensive and more easily compatible with other components of the dynamic shaft seal.

It is preferred according to exemplary embodiments of the present invention that the elastomeric material comprises fluororubber and/or nitrile butadiene rubber. It is more preferred according to exemplary embodiments of the present invention that the elastomeric material comprises fluororubber. According to exemplary embodiments of the present invention, it is even more preferred that the elastomeric material is composed of fluororubber only. When fluororubber is used, improved wear resistance has been obtained in practical tests. When in contact with fuels, fluororubber is chemically particularly stable.

According to exemplary embodiments of the present invention, it is preferred that the elastomeric material is at least partially peroxide crosslinked, more preferably completely peroxide crosslinked. Compared to peroxide crosslinked elastomers, in particular peroxide crosslinked fluoroelastomers, in particular (fluoro)elastomers crosslinked with bisphenol are regularly more abrasion resistant. In accordance with exemplary embodiments of the present invention, it was surprisingly found that peroxide crosslinked elastomeric material as component (a) leads to a dynamic shaft seal with improved abrasion properties. Peroxide crosslinked elastomeric material as component (a) also improves the resistance of the dynamic shaft seal according to exemplary embodiments of the present invention to media to be sealed. Where fluoroelastomers form part or all of component (a), these beneficial effects may be even more pronounced.

It is preferred according to exemplary embodiments of the present invention that the dynamic shaft seal does not comprise polyimide and/or fibers, in particular not aramid fibers. The dynamic shaft seal according to exemplary embodiments of the present invention does not require such additives, which facilitates its manufacturability.

According to exemplary embodiments of the present invention, it is preferred that the dynamic shaft seal, in particular as a radial shaft seal, has a running track width of at most <0.60 mm, preferably of at most <0.55 mm, more preferably of at most <0.50 mm. The determination of the running track width of the seal edges is carried out by means of an optical microscope at 25× magnification. When used in a tribological system, the abrasion of a dynamic shaft seal increases with time. The abrasion is reflected, among other things, in the so-called running track width. This corresponds to the width of the mating surface on which the dynamic shaft seal runs. The running track width is initially low and becomes wider in the course of use. If the running track width becomes too wide, the tribological system will suffer leakage. A dynamic shaft seal according to the invention with a preferred track width of at most <0.60 mm, better of at most <0.55 mm, even better of at most <0.50 mm can prevent leakage of the tribological system concerned.

According to exemplary embodiments of the present invention, it is preferred that the dynamic shaft seal comprises further fillers. Inorganic fillers and organic fillers can be used as fillers. Examples of inorganic fillers are silicates, preferably aluminosilicates and calcium silicates, more preferably kaolinite with the formula $Al_4[(OH)_8|Si_4O_{10}]$ and/or wollastonite with the formula $Ca_3[Si_3O_9]$. Examples of organic fillers are polymer fillers and cotton. According to exemplary embodiments of the present invention, the fillers are preferably inorganic fillers, more preferably silicates, even more preferably alumino silicates and calcium silicates, in particular kaolinite and wollastonite. According to exemplary embodiments of the present invention, it is preferred that the dynamic shaft seal contains such fillers in an amount of from 10 to 50 phr, more preferably from 20 to 40 phr. According to exemplary embodiments of the present invention, it is particularly preferred that the dynamic shaft seal contains inorganic fillers, more preferably silicates, still more calcium silicates and in particular wollastonite in an amount of from 10 to 50 phr, more preferably from 20 to 40 phr.

Exemplary embodiments of the present invention are also a tribological system comprising:
(A) a shaft, and
(B) a dynamic shaft seal sealingly adjacent to the shaft, the dynamic shaft seal comprising elastomeric material and graphene without chemically modified surface.

According to exemplary embodiments of the present invention, it was surprisingly found that such a tribological system shows an improved wear behavior, i.e., a reduction of abrasion. The reduction in wear becomes apparent in the technical application when the dynamic shaft seal develops a sealing effect. This occurs when the dynamic shaft seal is sealingly adjacent to (in sealing contact with) a shaft. In this case, a reduction in wear is seen both on the dynamic shaft seal and on the shaft.

In the context of the present invention, "shaft" refers to an elongated and regularly cylindrical member. A shaft is typically used to transmit rotary motion and torque between parts fixedly connected thereto. Such a shaft has an elongated outer surface to which a dynamic shaft seal may be sealingly adjacent in a tribological system. The dynamic shaft seal is adjacent in such a way that two separate half-spaces are created. The dynamic shaft seal prevents a medium from passing between the half-spaces. The dynamic shaft seal is therefore in sealing contact. The elongated outer surface of the shaft corresponds to the mating surface of the dynamic shaft seal in the area where the dynamic shaft seal is in contact.

During operation of the tribological system according to exemplary embodiments of the present invention, the dynamic shaft seal regularly slides with a seal edge of a seal lip on the then rotating shaft surface. The inner diameter of the seal lip in the unstressed state is typically smaller than the shaft diameter. This difference in diameter is called overlap (preload). During operation, the seal lip is pressed against the shaft surface in a radial direction. This creates a radial force on the shaft surface. The radial force of a dynamic shaft seal decreases over time, for example, due to aging of an elastomeric material contained in the dynamic shaft seal. In a tribological system according to exemplary embodiments of the present invention, a decrease in a desired radial force can be prevented over a longer period of operation of the tribological system. The radial force is determined with a radiameter according to DIN 3761 part 9.

According to exemplary embodiments of the present invention, it is preferred that the dynamic shaft seal in the tribological system according to these embodiments of the present invention is a dynamic shaft seal according to these embodiments of the present invention. With a dynamic shaft seal according to exemplary embodiments of the present invention, the wear on the dynamic shaft seal and/or the wear on the shaft is further reduced in the tribological system.

According to exemplary embodiments of the present invention, it is preferred that the shaft in the tribological system according to these embodiments of the present invention has a metal surface against which the dynamic shaft seal sealingly abuts. In the tribological system, the metal surface forms the mating surface of the dynamic shaft seal. According to these embodiments of the present invention, with such a metal surface, a further reduced wear is observed due to the sealingly abutting dynamic shaft seal.

According to exemplary embodiments of the present invention, it is preferred that the tribological system according to these embodiments is lubricated with at least one lubricant. The lubricant is preferably selected from oils and greases. According to exemplary embodiments of the present invention, the lubricant may be a single oil or a mixture of oils. According to exemplary embodiments of the present invention, the lubricant may be a single grease or a mixture of greases. According to exemplary embodiments of the present invention, the lubricant may be a mixture of one or more oils and one or more greases. The dynamic shaft seal prevents lubricant discharge from the tribological system. The dynamic shaft seal according to exemplary embodiments of the present invention has a high resistance to lubricants to be sealed, in particular to oils and greases.

Exemplary embodiments of the present invention also use of a dynamic shaft seal comprising elastomeric material and graphene without chemically modified surface to reduce abrasion of the dynamic shaft seal and/or a mating surface to which the dynamic shaft seal is sealingly adjacent.

According to exemplary embodiments of the present invention, it is preferred that in the use according to the invention the mating surface is made of metal and forms a longitudinal outer surface of a shaft. In the case of such a metal surface, further reduced wear is observed due to the dynamic shaft seal sealingly abutting the longitudinal outer surface.

According to exemplary embodiments of the present invention, it is preferred that a dynamic shaft seal according to these embodiments is used in the use according to exemplary embodiments of the present invention. Thus, all the advantages of the dynamic shaft seal according to these embodiments mentioned herein can be achieved in the use according to these embodiments.

Exemplary embodiments of the present invention are also a method of reducing abrasion, comprising the steps of:
(i) providing a dynamic shaft seal comprising elastomeric material and graphene without chemically modified surface,
(ii) arranging the dynamic shaft seal such that the dynamic shaft seal is sealingly adjacent to a shaft; and
(iii) rotational movement of the shaft.

According to exemplary embodiments of the present invention, it is preferred that a dynamic shaft seal according to exemplary embodiments of the present invention are used in the method according to exemplary embodiments of the present invention. Thus, all the advantages of the dynamic shaft seal according to embodiments of the invention mentioned herein can be achieved in the method according to exemplary embodiments of the invention.

According to exemplary embodiments of the present invention, it is preferred that the method according to these embodiments is carried out in a tribological system according to exemplary embodiments of the present invention. Thus, all the advantages of the tribological system according to exemplary embodiments of the present invention mentioned herein can be achieved in the method according to these embodiments.

WORKING EXAMPLES

Materials and Methods

1) The following materials were used:

| Trade name | Substance | Source of supply |
|---|---|---|
| VULKACIT NZ/EG-C | Crosslinker | Rhein-Chemie |
| Perkacit TBzTD | Crosslinker | Rhein-Chemie |
| Corax N 220 | Carbon black | The Cary Company |
| Dusantox IPPD | N-isopropyl-N'-phenyl-p-phenylenediamine | Duslo |
| Graphene SE 1132 | Graphene, pH 6.0 to 8.0, density < 0.1 g/cm3, specific surface area 180 to 260 m2/g, water content < 1.0 wt. %, particle size (D50, µm) < 10.0, carbon ≥ 93 wt. %, oxygen < 3 wt. %; without chemically modified surface; non-functionalized; | The Sixth Element Inc. |
| Graphite UF 4 96/97 | ultrafine graphite powder | Graphit Kropfmühl |
| Kumanox 13 (6PPD) | N-(1,3-dimethylbutyl)-N'-phenyl-p-phenylenediamine | Kumho Petrochemical |
| Luperox 101 | 2,5-bis(tert-butylperoxy)-2,5-dimethylhexane | Sigma-Aldrich |
| Nanocyl NC 7000 | multi-walled carbon nanotubes | Nanocyl SA |
| Palmera B 1805 | Stearic acid | Avocal |
| Perbunan 2870 F | Acrylonitrile butadiene rubber | Lanxess |
| Rhenogran S-80 | hardener, 80% sulphur, 20% elastomer binder and dispersant | Lanxess |
| Rhenogran ZnO-80 | hardener, 80% zinc oxide, 20% elastomer binder and dispersant | Lanxess |
| TAIC | Triallyl isocyanurate | Kettlitz |
| Tecnoflon P757 | medium viscosity, partially fluorinated (67%) and peroxide crosslinkable fluoroelastomer | Solvay |
| Wollastocoat | Wollastonite | Imerys |
| Vulkalent E/C | N-phenyl-N-(trichloromethylsulphenyl)benzene sulphonamide with additives | Lanxess |

2) The following parameters were determined as indicated:
Hardness, in ShA: Hardness test according to Shore A as per DIN 53505:2000-08
M100%, in MPa: Modulus value, equal to stress value at 100% elongation, according to DIN 53504
Tensile strength (TS), in MPa: according to DIN 53504:2007-13, condition S2, at 23° C.
Elongation at break (EB), in %: according to DIN 53504:2007-13, condition S2, at 23° C.
Compression set (CS), in %, according to DIN ISO 815, A
3) The following test methods were used:
Test Arrangement for Radial Strain:
BAB3SL 0.5 60-80-7; from LC Simmerring Industry, dust lip removed
Medium: Mobil Nuto H68; 80° C.
3000 l/min; arrangement in the middle of the shaft
24 h 0 bar/48 h 1.5 bar/1 h 0 bar
Pin/disc tribometer:
Medium: MOTUL 8100 X-clean 5W40; RT
Normal load: 40 N
Sliding speed: 10 mm/s
Stroke: 100 mm
4 cycles, 60 seconds waiting time between cycles, analysis of 3 cycles
Δ-radial force (delta radial force), in %: DIN 3761 Part 9 Radiameter
Running track width, in mm: Flender specification FS PLM 1110008 determined
Optical evaluations, as overall grade: Flender specification FS PLM 1110008 determined
Overall grade: Flender specification FS PLM 1110008 determined
Static coefficient of friction dimensionless: The static coefficient of friction is that measured when the surfaces in contact are not yet in relative motion, commonly known as the coefficient of static friction.
Dynamic coefficient of friction dimensionless: The dynamic coefficient of friction is consequently the one when the two surfaces move relative to each other (coefficient of sliding friction)

Examples 1 to 4

A series of mixtures was prepared. A mixture with only the mineral filler wollastonite serves as a reference (Example 1). In further mixtures, the wollastonite was partially replaced by either CNTs (Example 2), graphene (Example 3) or graphite (Example 4). In each case, test plates and dynamic shaft seals, namely radial shaft seals (RSS), were manufactured from these mixtures. Mechanical values were determined on the test plates. Table 1 lists the compositions of Examples 1 to 4 and their mechanical properties.

TABLE 1

| Example | Example 1 (reference) | Example 2 (comparison) | Example 3 (invention) | Example 4 (comparison) |
|---|---|---|---|---|
| Carbon additive | — | CNT 3 phr | Graphene 0.5 phr | Graphite 2 phr |
| Composition | | | | |
| Tecnoflon P757 | 100 | 100 | 100 | 100 |
| Wollastocoat | 30 | 7.5 | 24 | 24 |
| TAIC | 3 | 3 | 3 | 3 |
| Luperox 101 | 5 | 5 | 5 | 5 |
| Nanocyl NC 7000 | — | 3.5 | — | — |
| Graphene SE 1132 | — | — | 0.5 | — |
| Graphite UF 4 96/97 | — | — | — | 2 |
| TAIC | 1.5 | 1.5 | 1.5 | 1.5 |
| Luperox 101 | 2 | 2 | 2 | 2 |
| XL 45 E Mechanical properties | | | | |
| Hardness [ShA] | 72 | 71 | 69 | 69 |
| TS [MPa] | 14.9 | 20.6 | 14.8 | 12.8 |
| EB [%] | 338 | 310 | 363 | 384 |
| CS [%] | 19 | 19 | 13 | 17 |

The mixtures were adjusted to a comparable hardness. Without being bound by theory, it is assumed in accordance with the invention that if the hardness is comparable, the surfaces of the filler systems are also approximately comparable.

In addition to the mechanical properties, the wear behavior of the radial shaft seals manufactured from the exemplary mixtures was tested. For this purpose, the radial shaft seals were tested on the test rig under realistic conditions for wear behavior both on the component and on the mating surface of the shaft. Table 2 lists Examples 1 to 4 in connection with the wear properties determined.

TABLE 2

| Example | Example 1 (reference) | Example 2 (comparison) | Example 3 (invention) | Example 4 (comparison) |
|---|---|---|---|---|
| Carbon additive | — | CNT 3.5 phr | Graphene 0.5 phr | Graphite 2.0 phr |
| Test run at the RSS | | | | |
| Δ Radial force [%] (l/r) | −26.4/−8.0 | −21.2/−13.7 | −3.1/−5.7 | −2.0/−3.6 |
| Running track width [mm] (l/r) | 0.63-0.89 | 0.56-0.7 | 0.37-0.52 | 0.67 |
| | 0.37-0.48 | 0.44-0.7 | 0.37-0.48 | 0.74-0.85 |
| optical findings (overall score) (l/r) | 1.9/1.1 | 1.8/1.9 | 1.3/1.4 | 1.8/1.8 |
| Overall score (l/r) | 1.9/1.2 | 1.6/1.6 | 1.2/1.2 | 1.6/2.2 *Leakage |
| Pin/disc | | | | |
| Static coefficient of friction μ [−] | 0.42 | 0.36 | 0.46 | — |
| Dynamic coefficient of friction μ [−] | 0.23 | 0.19 | 0.26 | — |

Figure 4:
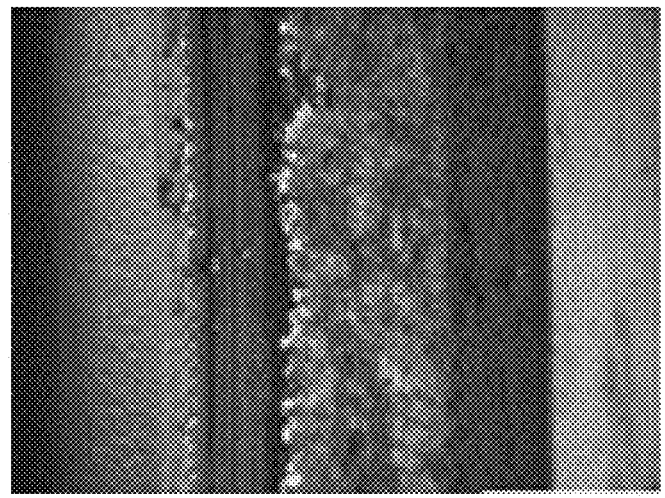
FIG. 4 shows a visual finding of Example 1.
Figure 5:
FIG. 5 shows a visual finding of Example 2.
Figure 6:
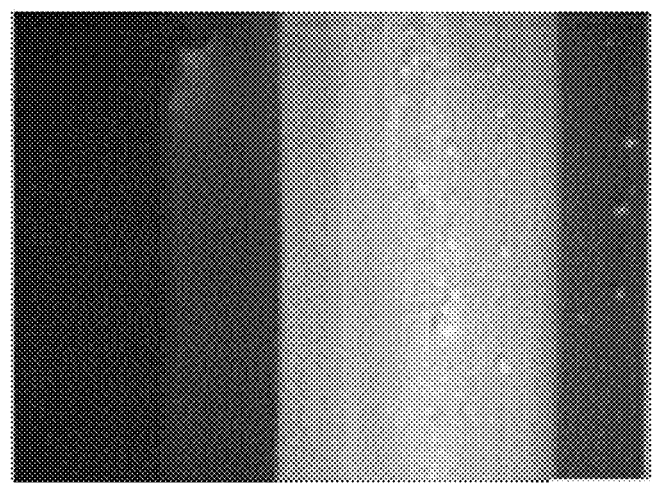
FIG. 6 shows a visual finding of Example 3.

The optical evaluations listed in Table 2 quantify the measurement results shown in the figures. FIGS. 4 to 6 show optical findings of the reference (FIG. 4), the CNT-containing mixture (FIG. 5) and the graphene-containing mixture (FIG. 6). The findings of FIGS. 4 and 5 are comparable overall. The findings of FIG. 6 show significantly improved abrasion properties.

Overall, it was surprising that an addition of only small amounts of graphene is sufficient to achieve a significant improvement in wear behavior. The surprising improvement is shown here in comparison to CNT- or graphite-filled mixtures. which chemically have a similar structure (carbon with sp2 hybridization). In Example 3, the decrease in radial force is significantly reduced. In Example 3, the running track width is also significantly reduced. Example 3 according to an exemplary embodiment of the present invention provides the best optical findings. It is also surprising that the graphene mixture has a decreased total filler content, and yet comparable hardnesses and tensile strengths are found.

Typically, in particular large and hard filler systems such as kaolinite, wollastonite, etc. are used. These are used so that the comparatively abrasion resistant rubber is protected by these hard and abrasion resistant fillers. In accordance with exemplary embodiments of the present invention, it was surprisingly found that the reduction of the hard filler wollastonite compared to the reference by the significantly softer filler graphene in Example 3 nevertheless leads to an improvement in wear resistance in the form of a reduced running track width.

In addition, the further series of tests investigated how the elastomer mixtures behave under static, dynamic and rotational friction forces, respectively. A pin/disc test was performed to simulate translational applications. For applications with rotational motion, a test run was performed on the radial shaft seal.

The tests with the pin/disc tribometer showed a completely different picture. The graphene-containing mixture of Example 3 showed no improvement in the static or dynamic coefficient of friction. In contrast, Example 2 with CNT showed some improvement. Based on this, it is understood that graphene will not lead to any improvements in wear in translational seals with opposing or reciprocal motions. For rotary seals such as dynamic shaft seals with radial motion, the use of graphene surprisingly leads to a significant improvement in wear.

In the above examples, mixtures with fluoroelastomer or fluororubber were investigated. The use of graphene in this elastomeric material proved to be particularly advantageous with regard to the behavior of a radial shaft seal made from it. In addition, peroxide could be used here for crosslinking in order to achieve additional resistance to media such as lubricants, especially oils and greases. These are normally less resistant to wear than bisphenol crosslinked mixtures.

Examples 5 and 6

In order to investigate the effectiveness of adding even small amounts of graphene to the mechanical properties of an elastomer mixture, a mixture with nitrile-butadiene rubber was additionally prepared in Example 5. Furthermore, no peroxide crosslinking agent was added to this mixture. For comparison, a corresponding mixture without graphene and with increased carbon black content was prepared as Example 6. Table 5 compares Example 5 and Example 6 together with the mechanical properties determined.

TABLE 5

| Example | Example 5 (invention) | Example 6 (comparison) |
|---|---|---|
| Perbunan 2870 F | 95.6 | 97.5 |
| Palmera B 1805 | 1 | 1 |
| Corax N 220 | 64 | 70 |
| Graphene SE 1132 | 0.5 | — |
| Kumanox 13 (6PPD) | 1.5 | 1.5 |
| Dusantox IPPD | 1.5 | 1.5 |
| VULKACIT NZ/EG-C | 1 | 1 |
| Perkacit TBzTD | 0.5 | 0.5 |
| Rhenogran S-80 | 0.75 | 0.5 |
| Rhenogran ZnO-80 | 6.25 | 6.25 |
| Vulkalent E/C | 2 | 2 |
| Mechanical properties | | |
| Hardness [ShA] | 78 | 80 |
| M100 % [Mpa] | 5.7 | 6.1 |
| TS [MPa] | 26.7 | 25.5 |
| EB [%] | 347 | 280 |
| CS [%] 24 h/100° C. | 32 | 36 (72 h) |

Both preparations were comparable with regard to hardness, stress value at 100% elongation as well as tensile strength. It can be seen that with otherwise comparable properties, the elongation at break was significantly improved in Example 5. Thus, the small addition of graphene in this example has a positive influence on the mechanical properties, in particular on the elongation at break, even when another elastomer different from FPM is used and even without the use of peroxide as crosslinking agent.

Example 7

Figure 2:
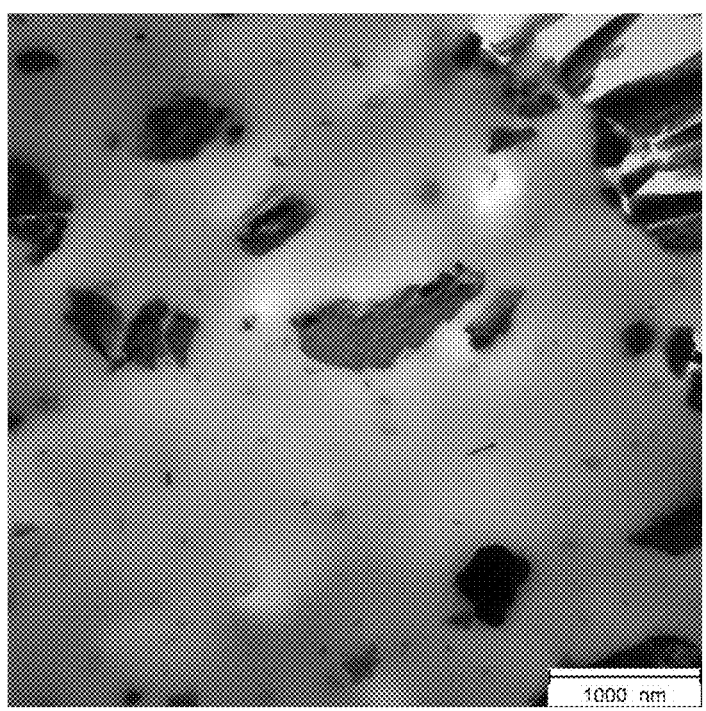
FIG. 2 is a TEM image of a mixture, serving as a reference, which contains only mineral filler.
Figure 3:
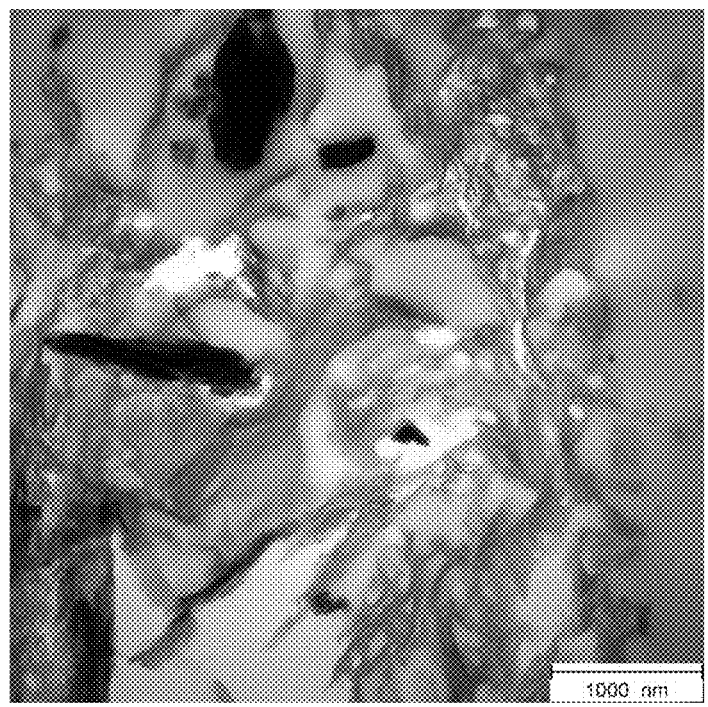
FIG. 3 is a TEM image of a mixture, serving as a comparative example, with reduced mineral filler and graphene.

Graphene was detected in the transmission electron microscopy as a structure that can be described as "tulle-like", see also FIG. 1. It could be shown that the morphology and size were completely preserved after mixing into the rubber matrix. There was no cross-linking or linking of the graphene with the rubber matrix. The dimensions in length and width can range from less than 100 nm to several micrometers. The thickness is recognizably very small, as described above. In the TEM images, the platelets appear almost transparent in the smoothly overlying areas. The particles are compressed in some places due to the small thickness. In contrast, a mineral filler appears in a TEM image as rather opaque and chunky, as can be seen in FIG. 2. FIG. 3 shows a TEM image of a mixture containing both graphene and mineral filler. The filigree areas with graphene on the one hand and the solid appearing areas with mineral filler on the other hand are clearly visible.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A dynamic shaft seal, comprising:
   (a) an elastomeric material, and
   (b) graphene without a chemically modified surface in an amount of 0.1 to 2 phr, based on 100 parts by weight of the elastomeric material, as the sole elemental carbon component of the dynamic shaft seal,
   wherein the dynamic shaft seal is a lip seal having a seal lip which is in radial contact with a rotating part during operation, the lip seal having to different seal edge angles.

2. The dynamic shaft seal of claim 1, wherein the graphene has a layer thickness of <3.35 nm.

3. The dynamic shaft seal according to claim 1, wherein the dynamic shaft seal comprises graphene in an amount of 0.1 to 1 phr based on 100 parts by weight of the elastomeric material.

4. The dynamic shaft seal according to claim 1, wherein the dynamic shaft seal comprises a composition having a compression set according to DIN ISO 815, A of ≤16%.

5. The dynamic shaft seal according to claim 1, wherein the elastomeric material comprises fluororubber.

6. The dynamic shaft seal according to claim 1, wherein the elastomeric material is at least partially peroxide cross-linked.

7. The dynamic shaft seal according to claim 1, wherein the dynamic shaft seal does not comprise polyimide and/or fibers.

8. The dynamic shaft seal according to claim 1, wherein the dynamic shaft seal has a running track width of less than 0.60 mm, as determined using an optical microscope at 25× magnification.

9. A tribological system, comprising:
   (A) a shaft, and
   (B) a dynamic shaft seal sealingly adjacent to the shaft, the dynamic shaft seal comprising an elastomeric material and graphene without a chemically modified surface,
   wherein the dynamic shaft seal comprises the graphene without the chemically modified surface in an amount of the 0.1 to 2 phr, based on 100 parts by weight of the elastomeric material, as the sole elemental carbon component of the dynamic shaft seal, and
   wherein the dynamic shaft seal is a lip seal having a seal lip, which is in radial contact with the shaft during operation, the lip seal having two different seal edge angles.

10. The tribological system according to claim 9, wherein the shaft has a metal surface to which the dynamic shaft seal is sealingly adjacent.

11. The tribological system according to claim 9, wherein the tribological system is lubricated with at least one lubricant.

12. The tribological system of claim 9, further comprising a mating surface to which the dynamic shaft seal is sealingly adjacent.

13. The tribological system according to claim 12, wherein the mating surface is made of metal and forms a longitudinal outer surface of a shaft.

14. A method of reducing abrasion comprising the steps of:
   (i) providing a dynamic shaft seal comprising an elastomeric material and graphene without a chemically modified surface,
   wherein the dynamic shaft seal comprise the graphene without the chemically modified surface in an amount of 0.1 to 2 phr, based on 100 parts by weight of the elastomeric material, as the sole elemental carbon component of the dynamic shaft seal,
   (ii) arranging the dynamic shaft seal such that the dynamic shaft seal is sealingly adjacent to a shaft; and
   (iii) rotationally moving the shaft,
   wherein the dynamic shaft seal is a lip seal having a seal lip, which is in radial contact with the shaft during operation, the lip seal having two different edge angles.

* * * * *